United States Patent [19]

Krueger

[11] Patent Number: 4,751,690
[45] Date of Patent: Jun. 14, 1988

[54] FIBER OPTIC INTERFEROMETRIC HYDROPHONE

[75] Inventor: Helmut H. A. Krueger, Elgin, Ill.

[73] Assignee: Gould Inc., Rolling Meadows, Ill.

[21] Appl. No.: 861,947

[22] Filed: May 12, 1986

[51] Int. Cl.$^4$ .................. H04R 23/00; G01L 1/24
[52] U.S. Cl. .................. 367/149; 367/140; 367/141; 73/800
[58] Field of Search .......... 367/149, 140; 73/800, 73/657; 350/96.1; 356/345

[56] References Cited

U.S. PATENT DOCUMENTS

| | | | |
|---|---|---|---|
| 3,647,302 | 3/1972 | Zipin et al. | 356/106 |
| 4,133,612 | 1/1979 | Redman | 356/350 |
| 4,139,130 | 3/1980 | Young et al. | 367/140 |
| 4,153,370 | 5/1979 | Corey, III | 356/358 |
| 4,163,397 | 8/1979 | Harmer . | |
| 4,191,470 | 3/1980 | Butter | 73/800 |
| 4,249,076 | 2/1981 | Bergstrom | 250/227 |
| 4,265,122 | 5/1981 | Cook et al. | 73/627 |
| 4,294,513 | 1/1981 | Nelson et al. | 367/140 |
| 4,303,302 | 12/1981 | Ramsey et al. . | |
| 4,310,905 | 1/1982 | Palmer | 367/140 |
| 4,313,185 | 1/1982 | Chovan | 367/140 |
| 4,360,247 | 11/1982 | Beasley | 367/140 |
| 4,364,639 | 12/1982 | Sinclair et al. | 350/331 |
| 4,373,814 | 2/1983 | Lacombat | 356/350 |
| 4,380,394 | 4/1983 | Stowe | 356/358 |
| 4,408,829 | 10/1983 | Fitzgerald et al. | 367/140 |
| 4,446,543 | 5/1984 | McLandrich et al. | 73/800 |
| 4,449,210 | 5/1984 | Myer | 367/149 |
| 4,450,541 | 5/1984 | Tietjen | 367/149 |
| 4,471,474 | 9/1984 | Fields | 367/149 |
| 4,477,725 | 10/1984 | Asawa et al. | 73/800 |
| 4,518,857 | 5/1985 | McMahon | 367/140 |
| 4,525,818 | 6/1985 | Cielo et al. | 367/149 |
| 4,648,082 | 3/1987 | Savit | 367/149 |

OTHER PUBLICATIONS

Single-Mode All-Fiber Michelson Interferometer-For Sensing Applications; 4/84; p. 42.
Fiber Optics Strain Gauge; 9/78; vol. 17, No. 18; pp. 2867, 2868, 2869.
Optica Acta, 1985, vol. 32, No. 2, "Monomode Fibre Optic Interferometric Techniques in Flow Velocity Measurement", by Leilabady et al., pp. 233-240.

Primary Examiner—Stephen C. Buczinski
Assistant Examiner—Melissa L. Koltak
Attorney, Agent, or Firm—G. P. Edgell; R. J. Fox; E. E. Sachs

[57] ABSTRACT

A fiber optic interferometric hydrophone is based on the change in optic path length of optic fibers bonded to both sides of a bending beam which acts as an acoustically sensitive diaphragm.

The bending beam is segmented into an even number of segments, acoustic windows are arranged such that opposite sides of the beam see the acoustic field in adjacent segments, and the optic fibers cross from one side of the beam to the other to maintain the phase of strain signal for the two fibers, one on each side, along the full length of the bending beam. The fringe sensitivity of the interferometer is multiplied by two since both interferometer legs are strained by the acoustic field, and of opposite sign, and further multiplied by the number of segments compared to a single simple beam bender of the dimensions of one segment. This configuraion has the further advantages of cancelling out lateral acceleration noise, and of providing a larger transducer for integrating low level sounds, both of which improve the signal-to-noise level. The small lateral dimensions of such a hydrophone are advantageous in towed arrays. Ancillary equipment such as light source, and detectors, and mechanical packaging for various purposes, are well known in the art.

16 Claims, 3 Drawing Sheets

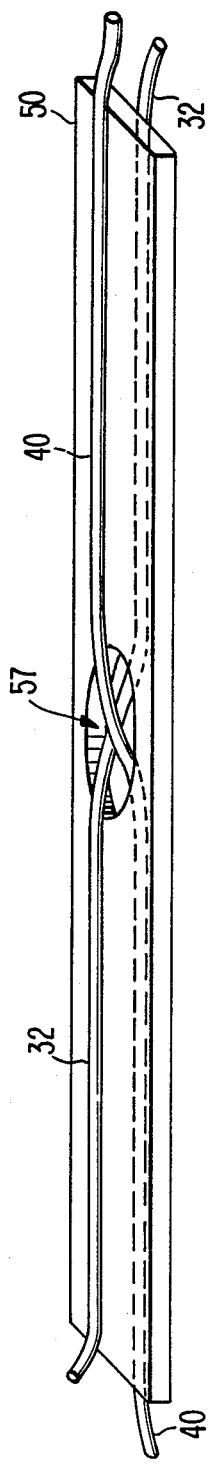
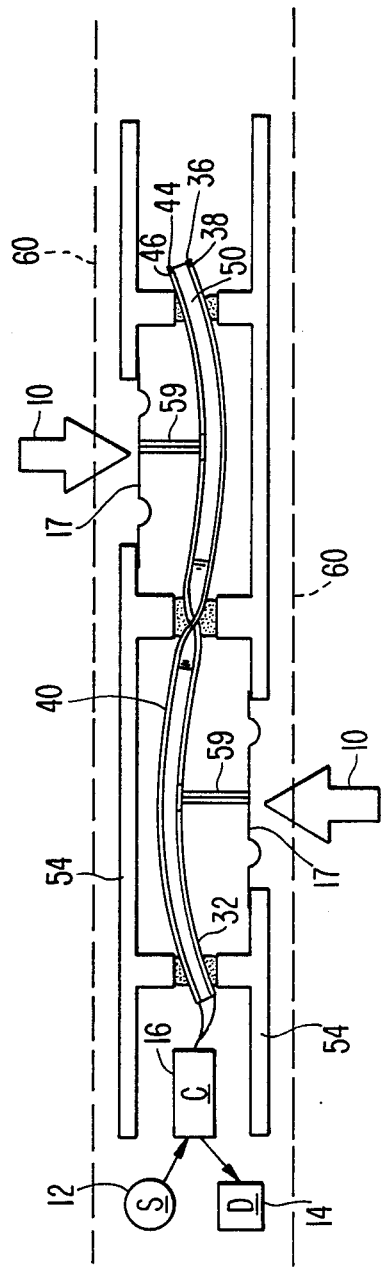

FIBER OPTIC INTERFEROMETRIC HYDROPHONE

BACKGROUND OF THE INVENTION

The present invention is an improved hydrophone that operates on the principles of fiber optic interferometers, that is, interferometers in which the sensing function takes place within optic fibers that compose the legs of the interferometer. This is done as an external variable, here, the acoustic field, changes the optic length of the sensing leg while the reference leg is left unchanged. Typically, these interferometers utilize two or more light splitting and light adding couplers within the system. Normally an evanescent wave coupler splits the source light between the two legs and a second evanescent wave coupler recombines the two beams. The light intensity at the detector is the result of the constructive or destructive interference between those two beams of light, which depends on the relative optic lengths of the two legs, hence the strain in the sensing leg.

This invention relates to acoustical or mechanical configurations of fiber optic hydrophones for use with light sources and detection devices necessary for the interferometer to function as a useful sound-measuring device.

The earliest fiber optic interferometric hydrophones consisted of two coils of fibers, one exposed to the acoustic field, the other shielded from it. Because of the inherent insensitivity of the fiber to acoustic variations in this hydrostatic environment, the coils required fiber lengths of hundreds of meters to be able to detect signals near "sea state zero", the experimentally determined lowest ocean noise level. To keep the overall dimensions of the hydrophone within reasonable bounds, the fibers were wound into coils. However, optic fibers have increased losses if the radius of the bends are too sharp, and this usually puts a lower limit on coil diameters of one inch or larger. Also, the optic path length in the fibers is a strong function of temperature, and small temperature changes cause large noise signals in very long fibers.

The present invention provides a structure having a bending beam, which lessens both of these disadvantages. The bending beam can be configured as an acoustic diaphragm. For hydrophone use the lateral dimensions of the active parts can be reduced to less than one-fourth of an inch, and the length to two inches or less. In a line hydrophone for towed array purposes, this could reduce the overall diameter of the array's protective sheath to an inch or less, greatly reducing its weight and necessary storage space.

The present invention extends the advantages of a hydrophone constructed using the bending beam structure by increasing the sensitivity, if necessary, or increasing the ruggedness if sensitivity is adequate, and by reducing sensitivity to lateral noise accelerations because of its balanced design. A third advantage occurs from being able to adjust overall length dimensions of the hydrophone for purposes of integrating or averaging the acoustic signal, and for determining to some extent the frequency response limits of the device.

SUMMARY OF THE INVENTION

The present invention is an even-numbered string of fiber optic bender interferometric acoustic sensors combined to form one sensor. In the preferred embodiment of the invention the bendable beam, which forms the substrate for the sensing fibers and a diaphragm to intercept the acoustic field, is a single construction. Holes or notches in the beam allow the fibers to cross over to the opposite side at regular intervals. Beam supports are placed at the crossover points and at the beam ends. A stiff shell which supports the entire flexible structure has acoustically transparent windows between crossover points on opposite sides of the shell in each succeeding segment of the beam. Elastomeric sealing is used around each segment of the beam to isolate the back side of the beam from the impinging acoustic field. As a result, the bendable beam is deformed by the acoustic field into a wave-like shape along its length with stationary nodes at the fiber crossover points and the beam ends. It is easily seen that a compressional wave impinging on the sensor will deform the beam to be concave toward the acoustic windows. This will cause the single fiber on the concave faces to contract with the deformation. Likewise, the second fiber, on the convex face of every segment of the bendable beam, will be stretched. During the rarefaction portion of the acoustic wave these deformations will be of the opposite sign, and the fiber strains will also be of the opposite sign. The degree of strain experienced by the fibers is multiplied by the number of segments in the sensor.

OBJECTS OF THE INVENTION

It is a general object of the present invention to provide an improved fiber optic interferometric acoustic sensor.

It is a further object of the present invention to provide a fiber optic hydrophone which has increased sensitivity.

Another object of the invention is to provide a hydrophone with lateral acceleration noise cancellation.

It is a further object of the invention to provide an acoustic sensor with generous dimensional design leeway for purposes of acoustic signal integration and small overall package size.

BRIEF DESCRIPTION OF THE DRAWINGS

The features of the present invention which are believed to be novel are set forth with particularity in the appended claims. The invention together with further objects and advantages thereof may best be understood by reference to the following description taken in conjunction with the accompanying drawings, and in which:

FIG. 5 is a perspective view showing the orientation of optical fibers on a bendable material used in the novel fiber optic hydrophone.

FIG. 6 is another version of the invention in which sound gathering and sealing have been shifted to diaphragms on the structural shell of the hydrophone.

DESCRIPTION OF THE PREFERRED EMBODIMENT

Figure 1:
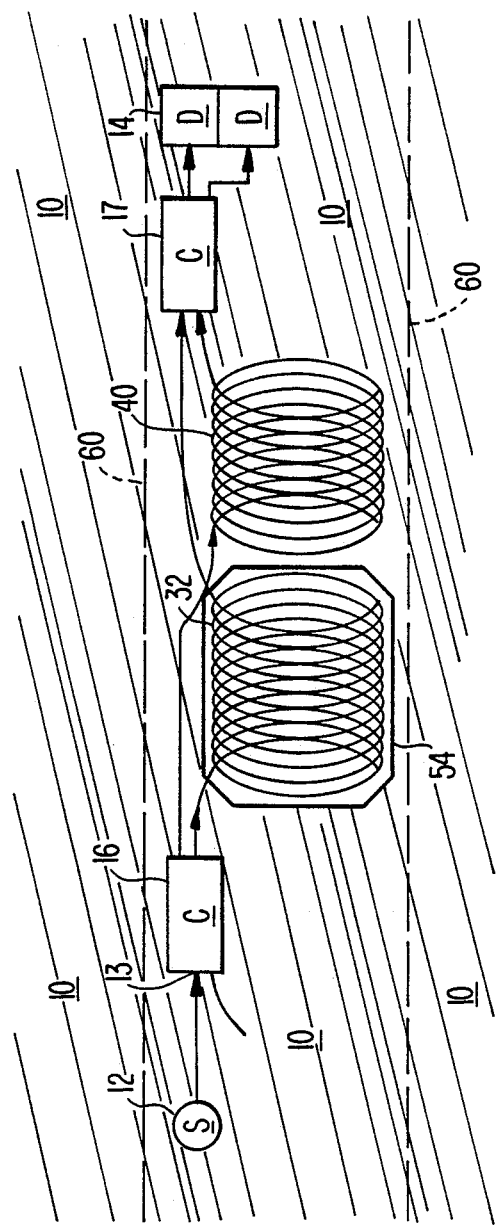
FIG. 1 is a schematic diagram of a prior art fiber optic interferometric hydrophone.
Figure 2:
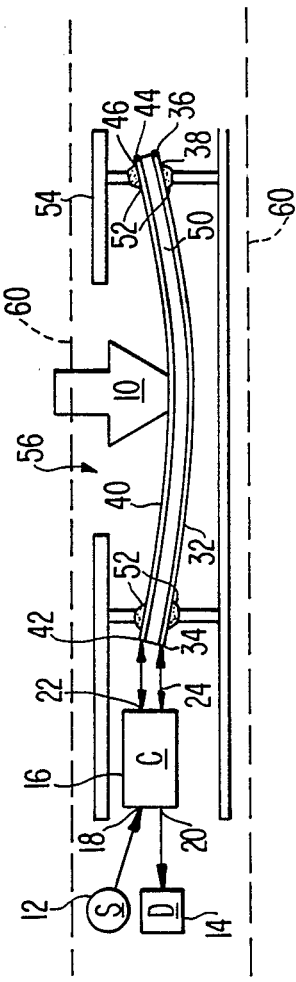
FIG. 2 is a schematic diagram of another prior art fiber optic hydrophone.

This invention relates in general to fiber optic interferometric hydrophones. In particular, this invention provides a fiber optic interferometer which has increased sensitivity compared with prior art interferometers. FIGS. 1 and 2 are schematic drawings of prior art fiber optic interferometers and FIGS. 3 and 6 are schematic drawings of the novel fiber optic interferometer.

FIG. 1 illustrates the prior art fiber optic interferometer. Typically, light source 12 introduces a single-frequency light into the first port 13 of evanescent wave coupler 16 (or other light splitter), which divides the light ideally equally to sensing fiber coil 40 and to reference fiber coil 32. The reference coil 32 is packaged in a rigid container 54 to shield it from the acoustic field, 10, or other means are used to accomplish this end. The path length of the optic beam in transversing 40 is changed by the passage of the compression and rarefaction phases of the acoustical field, represented by the lines of varying spacing 10, to be measured. Changed and unchanged light beams are recombined in coupler 17. The result is constructive or destructive interference varying the intensity of the light at the photo detectors 14. The dashed lines 60 represent a protective shell of a hose-like structure which, for a towed array, provides the mechanical connection to the ship, electrical power for operating light sources and detectors, and signal lines, fiber optic or electrical, to return data to the ship.

FIG. 2 is an advanced form of fiber optic acoustic hydrophone in which the stress multiplying capabilities of a bending beam structure are utilized to increase the sensitivity of the hydrophone and greatly reduce the length of fiber necessary in its construction. The curvature of the bendable beam 50 is greatly exaggerated in FIG. 2 to illustrate the compression of the optic fiber 40 bonded to the upper surface of the beam 50 and the elongation of the optic fiber 32 bonded to the lower surface of the beam 50 as the beam 50 responds to the compression phase of the acoustic wave 10. This structure doubles the interferometer's output as both interferometer legs or fibers 40 and 32 are strained, and in opposite sense, under the undulations of the acoustic field 10, now represented more simply by the large arrows. This example of the prior art also uses mirrors 36 and 44 at the ends 38 and 46 of the active fibers 32 and 40 respectively, to reflect the light back through the fibers 32 and 40, thereby doubling again the phase difference at the output detector 14. This construction thereby requires but one evanescent wave coupler 16, contributing to the economy of its construction. Also, because the bending beam structure has reduced lateral dimensions compared with the coils of the transducer of FIG. 1, the diameter of the ancillary hose 60 may be greatly reduced.

Figure 3:
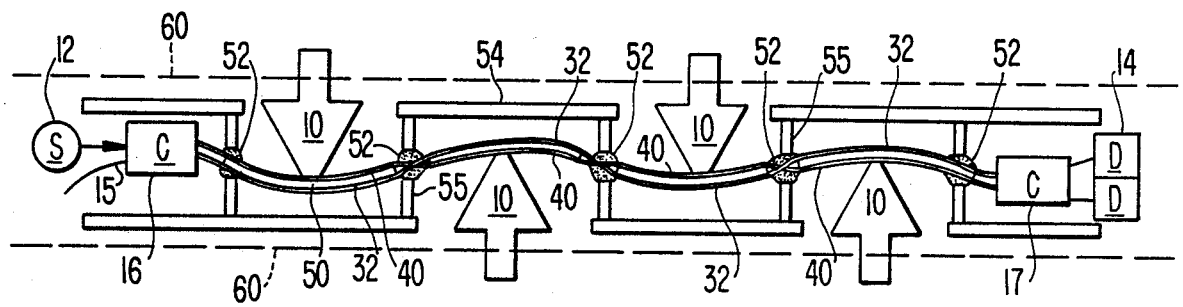
FIG. 3 is a schematic diagram of the novel fiber optic interferometric hydrophone.
Figure 4:
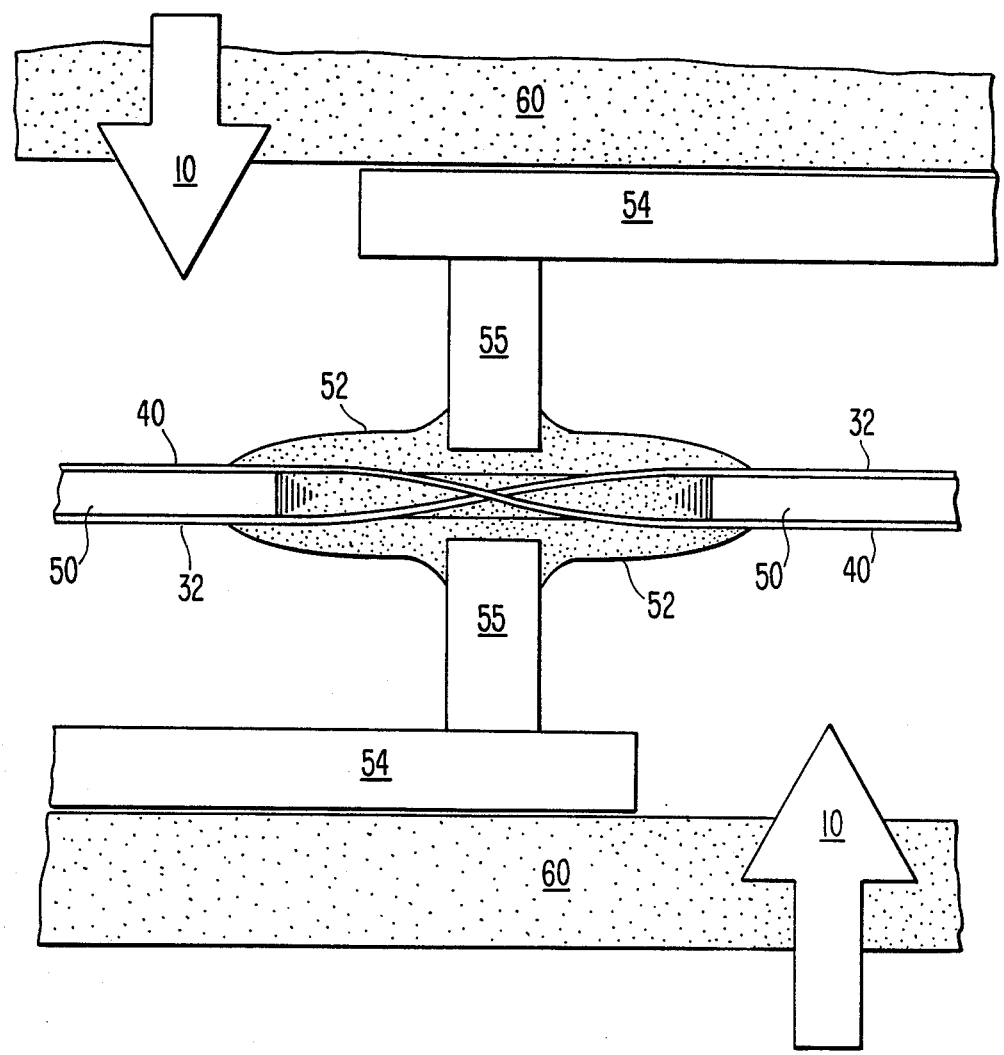
FIG. 4 is a detailed diagram of the structure in the fiber crossover region between sensor segments.

FIG. 3 illustrates the novel interferometric hydrophone of this invention. It is based on the prior art hydrophone of FIG. 2. The wave-like shape of the bendable beam 50 has been greatly exaggerated to illustrate again the compression of the fiber 40 on the face of the beam segment subjected to the compression phase of the acoustic wave 10, and the elongation of the fiber 32 on the opposite side of the beam 50. FIG. 4 shows a detailed view in the crossover region between the segments of the bendable beam 50, with one fiber 40 blackened to indicate clearly how it crosses over to remain on the side of the beam that compresses the fiber 40 during the compression phase of the acoustic wave 10. The opposite situation always exists for the fiber 32 on the other side of the bendable beam 50.

In the spirit of this invention, FIG. 3 shows a four segment interferometer; any multiple of two segments will give cancellation of noise due to lateral accelerations of the hydrophone, common in turbulent water for a towed array. This is because the bendable beam 50 will not deform to the illustrated wave-like shape under such acceleration; each segment will deform in the same direction instead. With the sensing fibers crossing over between segments, the compression seen in one segment is cancelled out by the elongation of the segment adjacent to it.

Also in the spirit of this invention, for the same segment construction, which may be proscribed by conditions of use, such as depth of deployment, etc., the hydrophone of FIG. 3 is longer by multiples of two times the length of the hydrophone of FIG. 2. In the usual undersea situation of signals close in strength to the ambient noise, this greater sensing length can better integrate the signal, improving the signal-to-noise ratio. The signal is also additive, segment-to-segment, so that the hydrophone of FIG. 3 has four times the sensitivity of the hydrophone of FIG. 2, assuming the same configuration. As illustrated, the enhancement is only twice that of FIG. 2, because FIG. 3 has been sketched with a standard two-coupler interferometer instead of the signal doubling single-coupler interferometer of FIG. 2. If the light source 12 is too sensitive to back-reflected light, the two-coupler interferometer may be necessary, but the drawing is not meant to imply that the single-coupler configuration is unsuitable for the multi-segment interferometer of FIG. 3.

In a preferred embodiment of the invention shown in FIG. 3, the light from source 12 of essentially fixed wavelength is led into the evanescent wave coupler 16, or other light splitter by coupling means well known in the fiber optic field, where the light is split, essentially half going into fiber 32, bonded to one side of the bendable beam 50, and the other half going into fiber 40 bonded to the opposite side of the beam 50. At the end of each segment length the fibers cross over to the opposite side of the bendable beam, emerging from the stressing structure to the second evanescent wave coupler 17, which recombines the light, allowing it to interfere constructively or destructively. This instantaneous fringe information is converted to electrical signals in the detectors 14, from which further signal processing may be done. If the single-coupler configuration is used, mirrors are plated on the ends of the fibers at the end of the bendable beam 50, and a single detector is placed at the unused input lead 15 of coupler 16, simplifying the system and doubling the phase change at the output. The stiff shell structure 54 compartmentalizes the acoustic energy so that the back sides of the segments are shielded from the acoustic field 10 and the front sides are exposed to it. At the ends of the segments the beam is simply supported by dividers 55 in the shell 54, the flexure of the beam 50 is diminished as little as possible by the elastomeric seal 52 between segments. As shown in FIG. 4 and FIG. 5, the fibers 32 and 40 cross over to the opposite sides of the bendable beam 50 through holes 57 in the beam 50 at the crossover points. The elastomeric seal 52 closes these holes 57 and also seals the compartments from each other at the dividers 55. The long edges of the beam 50 are also sealed to the inside of the shell structure 54, preferably with an elastomer to seal without substantially hindering the deflection of the beam 50. The structure 60 in FIGS. 4 and 6 represents the acoustically transparent hose which protects the hydrophone from its environment, provides the mechanical connection to the ship, supplies it with electrical power from the ship, and provides the space for sending acoustic data back to the ship by electrical or fiber optic means.

FIG. 6 illustrates a two-segment version of this invention in which the bendable beam 50 is only a stressing substrate for the fiber optic interferometer legs 40 and 32 bonded to it. In a limiting case the fibers 40 and 32 could be bonded to each other, eliminating the beam 50 entirely and providing a very compliant bending structure. In this version the segment-to-segment sealing and acoustic field gathering are provided by the diaphragms 17 sealed to the case 54, and the diaphragm deflections are transferred to the bendable structure by the driving pins, 59.

As is well known in the art of interferometers, most aspects of the preferred embodiment apply to all optic interferometers. For maximum fringe visibility or light-/dark ratio the lengths of the optic paths along fiber 40 and fiber 32 should be made as equal as possible. The means for getting light from the source 12 into the fiber should be as efficient as possible. Light losses in the system should be as little as possible, so the preferred embodiment uses single mode optic fibers and a low loss evanescent wave coupler. The detector 14 should have high detection efficiency at the frequency of the source 12. A short coherence, broad band light source such as an LED or laser diode can be used as well as a laser source sensitive to such feedback light, provided the detection scheme allows for the latter and prevents excessive feedback light.

The invention is not limited to the particular details of the apparatus depicted and other modifications and applications are contemplated. Certain other changes may be made in the above-described apparatus without departing from the true spirit and scope of the invention herein involved. It is intended, therefor, that the subject matter in the above depiction shall be interpreted as illustrative and not in a limiting sense.

What is claimed is:

1. A fiber optic interferometric acoustic sensor for measuring an external acoustic field comprising:
   means for providing a shell having at least two compartments, each of said at least two compartments having an associated opening in said means for providing a shell, said openings being in an opposed orientation in said means for providing a shell, said means for providing a shell also having a divider between said at least two compartments, said divider having an aperture;
   means for providing a bendable beam contained within said means for providing a shell and extending through said aperture in said divider, said means for providing a bendable beam having a first end attached to an end of one of said compartments opposite said divider, having a second end attached to an end of the other of said compartments opposite said divider, and having its midpoint attached to said divider; and
   first and second optical fibers attached to opposite sides of said means for providing a bendable beam, said first and second optical fibers extending through said first and second compartments of said means for providing a shell, and crossing over to opposite sides of said means for providing a bendable beam at said divider;
   the external acoustic field moving said first and second optical fibers and said means for providing a bendable beam such that said first optical fiber is stretched and said second optical fiber is compressed and vice versa, thereby changing the optical path lengths of both of said first and second optical fibers.

2. The sensor described in claim 1 wherein said sensor further comprises means for sealing said aperture in said divider such that said compartments are acoustically isolated, said means for sealing also attaching said means for providing a bendable beam and said first and second optical fibers to said divider.

3. The sensor described in claim 1, wherein said sensor further comprises:
   diaphragms over said openings in said means for providing a shell, said diaphragms responsive to the external acoustic field; and
   driving pins attached to said diaphragms and to said means for providing a bendable beam such that the external acoustic field is transferred from said diaphragms to said means for providing a bendable beam by said driving pins.

4. The sensor described in claim 1, wherein said means for providing a shell comprises an even numbered plurality of said compartments separated by a plurality of said dividers with said means for providing a bendable beam and said first and second optical fibers extending through each of said compartments, said first and second optical fibers crossing over to opposite sides of said means for providing a bendable beam at each of said dividers between said compartments, said openings in said means for providing a shell associated with said compartments being in an alternating opposed orientation in said means for providing a shell.

5. A fiber optic interferometric acoustic sensor for measuring an external acoustic field comprising:
   means for producing source light in a predetermined frequency range;
   means for splitting the source light, said means for splitting having an input for receiving the source light and having first and second output ports for outputting split source light;
   means for recombining light, said means for recombining having first and second input ports and having at least one output port for outputting received light;
   means for optically detecting the received light and for producing an information signal indicative thereof;
   first and second optical fibers, each having a predetermined length and a midpoint, and each having a first end optically connected, respectively, to said first and second output ports of said means for splitting the source light and each having a second end optically connected respectively to said first and second input ports of said means for recombining light, said first and second optical fibers attached longitudinally in a predetermined plane, the orientation of said first and second optical fibers between said first ends and the midpoint being opposite the orientation of said first and second optical fibers between said second ends and the midpoint; and
   means for supporting said first and second optical fibers near said first ends and also near said second ends, and at the midpoint which is substantially equidistant from either end of said first and second optical fibers, said means for supporting forming at least first and second compartments about said first and second optical fibers and including a divider at the midpoint of said first and second optical fibers, said divider having an aperture through which said first and second optical fibers pass, said means for supporting having a first opening in said plane of said first and second optical fibers over said portion of said fibers between said first ends and the midpoint and having a second opening in said plane opposed to said first opening over said portion of said first and second optical fibers between said second ends and the midpoint;

said first and second openings in said supporting means permitting the external acoustic field to move said first and second optical fibers such that either said first optical fiber is stretched and said second optical fiber is compressed or vice versa, thereby changing the optical path lengths of both of said first and second optical fibers.

6. The sensor described in claim 5, wherein said means for supporting comprises an even numbered plurality of said compartments separated by a plurality of said dividers with said first and second optical fibers extending through each of said compartments, said first and second optical fibers crossing over to an opposite orientation at each of said dividers between said compartments, said openings in said means for supporting associated with said compartments being in an alternating opposed orientation in said means for supporting.

7. The sensor described in claim 5, wherein said sensor further comprises means for providing a bendable beam, said first and second optical fibers being attached to opposite sides of said means for providing a bendable beam between first and second ends thereof, said means for providing a bendable beam having said first end attached to an end of one of said compartments opposite said divider, having said second end attached to an end of said other compartment opposite said divider, and having its midpoint attached to said divider, said means for providing a bendable beam being responsive to the external acoustic field.

8. The device described in claim 7 wherein said first and second optical fibers are attached to opposed sides of said means for providing a bendable beam.

9. A fiber optic interferometric acoustic sensor for measuring an external acoustic field comprising:
   means for producing source light in a predetermined frequency range;
   an optical coupler having an input for receiving the source light, having first and second ports for outputting split source light and for receiving reflected light and having an output for outputting a received light recombined by the coupler from the received reflected light;
   means for optically detecting the received light and for producing an information signal indicative thereof;
   first and second optical fibers, each having a predetermined length and a midpoint, each having a first end optically connected, respectively, to said first and second ports of said optical coupler, and each having a second end including a means for reflecting light attached thereto, said first and second optical fibers attached longitudinally in a predetermined plane, the orientation of said first and second optical fibers between said first ends and the midpoint being opposite the orientation of said first and second optical fibers between said second ends and the midpoint; and means for supporting said first and second optical fibers near said first ends and also near said second ends, and at the midpoint which is substantially equidistant from either end of said first and second optical fibers, said means for supporting forming first and second compartments about said first and second optical fibers and including a divider at the midpoint of said first and second optical fibers, said divider having an aperture through which said first and second optical fibers pass, said means for supporting having a first opening in said plane of said first and second optical fibers over said portion of said fibers between said first ends and the midpoint and having a second opening in said plane opposed to said first opening over said portion of said first and second optical fibers between said second ends and the midpoint;

said first and second openings in said supporting means permitting the external acoustic field to move said first and second optical fibers such that either said first optical fiber is stretched and said second optical fiber is compressed or vice versa, thereby changing the optical path lengths of both of said first and second optical fibers.

10. The sensor described in claim 9, wherein said means for supporting comprises an even numbered plurality of said compartments separated by a plurality of said dividers with said first and second optical fibers extending through each of said compartments, said first and second optical fibers crossing over to an opposite orientation at each of said dividers between said compartments, said openings in said means for supporting associated with said compartments being in an alternating opposed orientation in said means for supporting.

11. The sensor described in claim 9, wherein said sensor further comprises means for providing a bendable beam, said first and second optical fibers being attached to opposite sides of said means for providing a bendable beam between first and second ends thereof, said means for providing a bendable beam having said first end attached to an end of one of said compartments opposite said divider, having said second end attached to an end of said other compartment opposite said divider, and having its midpoint attached to said divider, said means for providing a bendable beam being responsive to the external acoustic field.

12. The device described in claim 11, wherein said first and second optical fibers are attached to opposed sides of said means for providing a bendable bea 13. A fiber optic interferometric acoustic sensor for measuring an external acoustic field, comprising:
   a shell structure having at least two compartments, each of said at least two compartments being substantially acoustically isolated and having an associated opening in said shell structure, the associated openings of adjacent ones of said at least two compartments being oriented in opposite directions with respect to each other;
   a bendable beam housed within said shell structure, said bendable beam having sides and extending through all of said at least two compartments;
   a first optical fiber coupled to said bendable beam along said at least two compartments, said first optical fiber being coupled to opposite sides of said bendable beam in adjacent ones of said at least two compartments; and a second optical fiber coupled to said bendable beam along said at least two compartments, said second optical fiber being coupled to said bendable beam on the side of said bendable beam opposite said first optical fiber in each of said at least two compartments, the external acoustic field impinging upon said first and second optical fibers and said bendable beam to stretch one of said first and second optical fibers and to compress the other of said first and second optical fibers so as to alter the optical path length of both of said first and second optical fibers.

14. The fiber optic interferometric acoustic sensor as set forth in claim 13, wherein said shell structure further includes a divider positioned between adjacent ones of said at least two compartments, said divider having an aperture through which said bendable beam and said first and second optical fibers extend.

15. The fiber optic interferometric acoustic sensor as set forth in claim 14, further comprising means for sealing the apertures in said divider to acoustically isolate said at least two compartments, said means for sealing surrounding said bendable beam and said first and second optical fibers.

16. The fiber optic interferometric acoustic sensor as set forth in claim 13, further comprising:
means for providing split source light to said first and second optical fibers; and
means for optically detecting light carried by said first and second optical fibers.

* * * * *